June 2, 1959     G. E. BASS ET AL     2,889,021
COMBINED CLUTCH-BRAKE MECHANISM
Filed Oct. 25, 1956     4 Sheets-Sheet 1

INVENTORS
GEORGE E. BASS
FRANK MARTINDELL

BY
ATTORNEY

June 2, 1959  G. E. BASS ET AL  2,889,021
COMBINED CLUTCH-BRAKE MECHANISM
Filed Oct. 25, 1956  4 Sheets-Sheet 2

INVENTORS
GEORGE E. BASS
FRANK MARTINDELL
BY
ATTORNEY

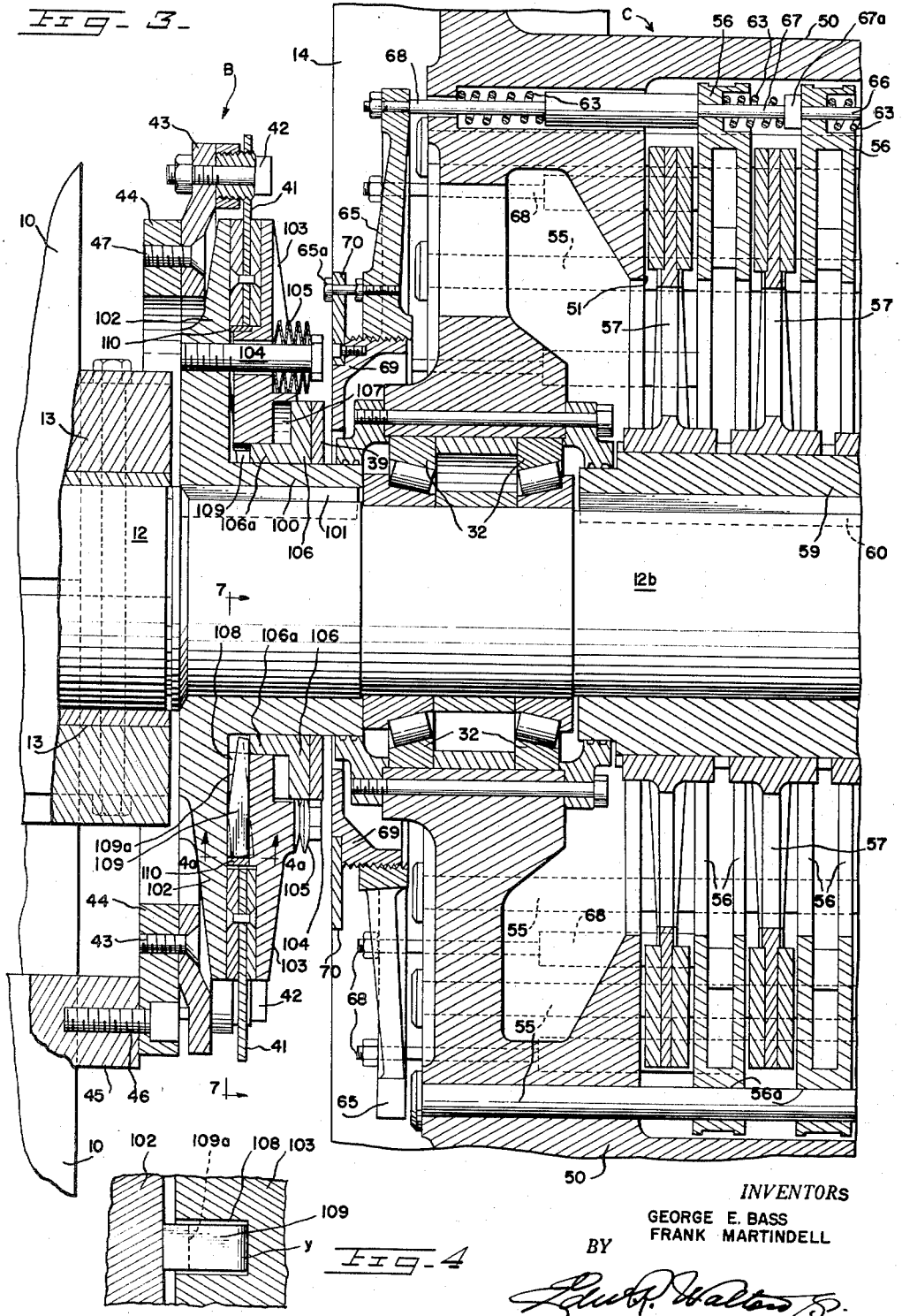

June 2, 1959  G. E. BASS ET AL  2,889,021
COMBINED CLUTCH-BRAKE MECHANISM
Filed Oct. 25, 1956  4 Sheets-Sheet 4

INVENTORS
GEORGE E. BASS
FRANK MARTINDELL
BY
ATTORNEY

United States Patent Office 2,889,021
Patented June 2, 1959

2,889,021

COMBINED CLUTCH-BRAKE MECHANISM

George E. Bass, near Bridgeton, and Frank Martindell, Bridgeton, N.J., assignors to Ferracute Machine Company, Bridgeton, N.J., a corporation of New Jersey Application October 25, 1956, Serial No. 618,341

7 Claims. (Cl. 192—18)

The present invention relates to improvements in, so-called, combined clutch-brake mechanisms of the type useful and generally employed in mechanical presses and similar machines designed for heavy-duty metal working.

Heretofore, such combined clutch-brake mechanisms of various forms have been disposed either directly on the driven crank shaft of such presses or on a "back" or driving shaft thereof; and in such a clutch-brake mechanism (particularly when of the type shown and described herein although not necessarily limited to it), an excessively heavy load or force is imposed momentarily upon the bearings of a driven pulley-flywheel or driving gear journalled on the shaft supporting said mechanism, during the time the said springs of the brake are being compressed against their biasing force to release or disengage the brake by the actuator, which, at the same time, is also moving the clutch into engagement. This additional load is in the order of about 60,000 pounds p.s.i. to the bearing's load capacity of about 100,000 pounds p.s.i.—thus accelerating the wear on or attrition of said bearings. It has been discovered that this excessive load can be reduced to one-half or less by interposing a lever means between the brake discs to be operated by the actuating means that shifts said brake discs against the bias of said springs, the amount of reduction being provided according to the ratio of the leverage employed and, further, resulting in a simple and compact assembly without additional external parts.

Consequently, the object of the present invention is to provide an improved clutch-brake mechanism or assembly in the particulars just indicated above, as well as in other particulars as will become apparent from the following detailed specification.

The invention resides in the novel features of construction, and the combination and organization of parts hereinafter more fully described and particularly pointed out in the appended claims.

In the accompanying drawings, which illustrate the invention in the embodiments in which it is at present devised:

Figure 3 is an enlarged sectional view of the combined clutch-brake mechanism taken substantially on line 3—3 of Figure 3 and illustrating the improved actuating means for releasing the brake whereby excessive load on the flywheel bearings is relieved during the brake-releasing movement;

Figure 4 is a fragmentary sectional view taken substantially on line 4a—4a of Figure 3, illustrating an end view of a lever member interposed between the brake plates;

Figure 1:
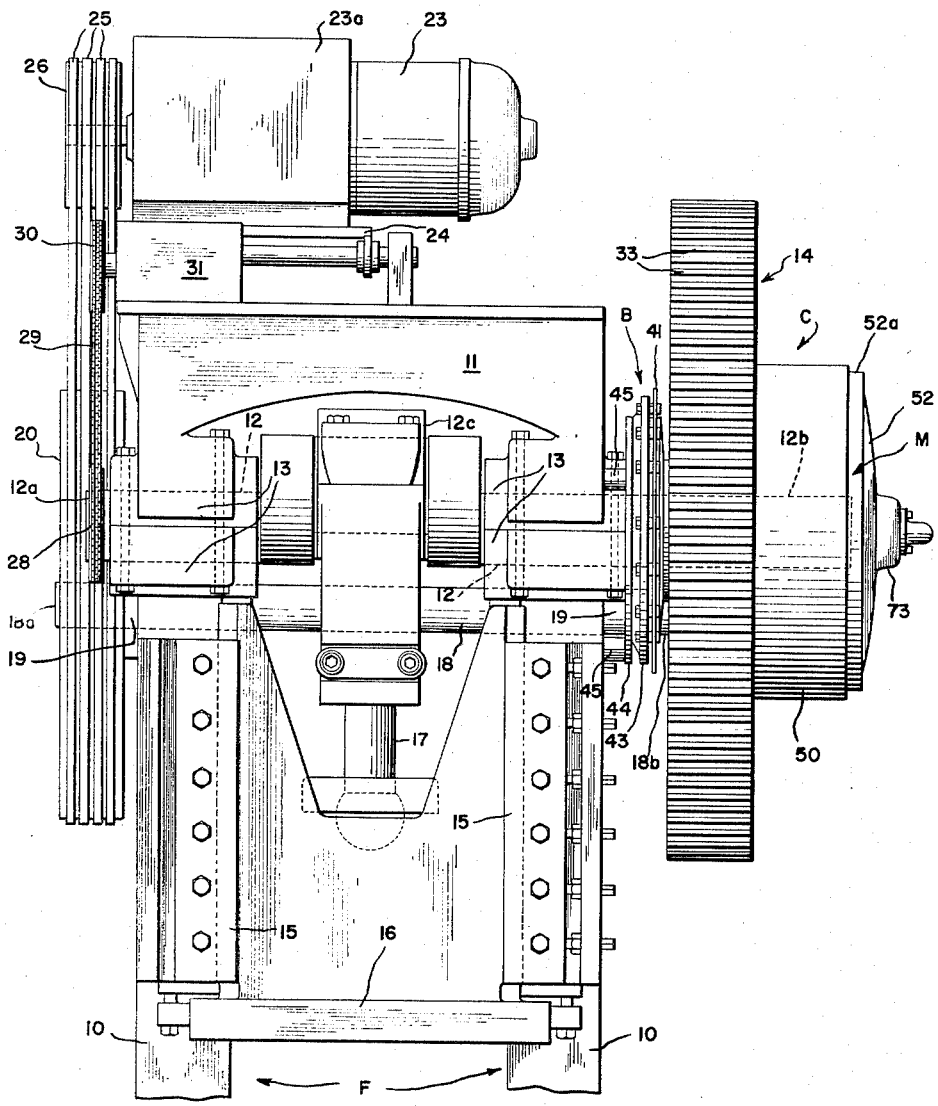
Figure 1 is a front elevational view of the upper portion of one form of press having a clutch-brake mechanism applied thereto in accordance with this invention.
Figure 2:
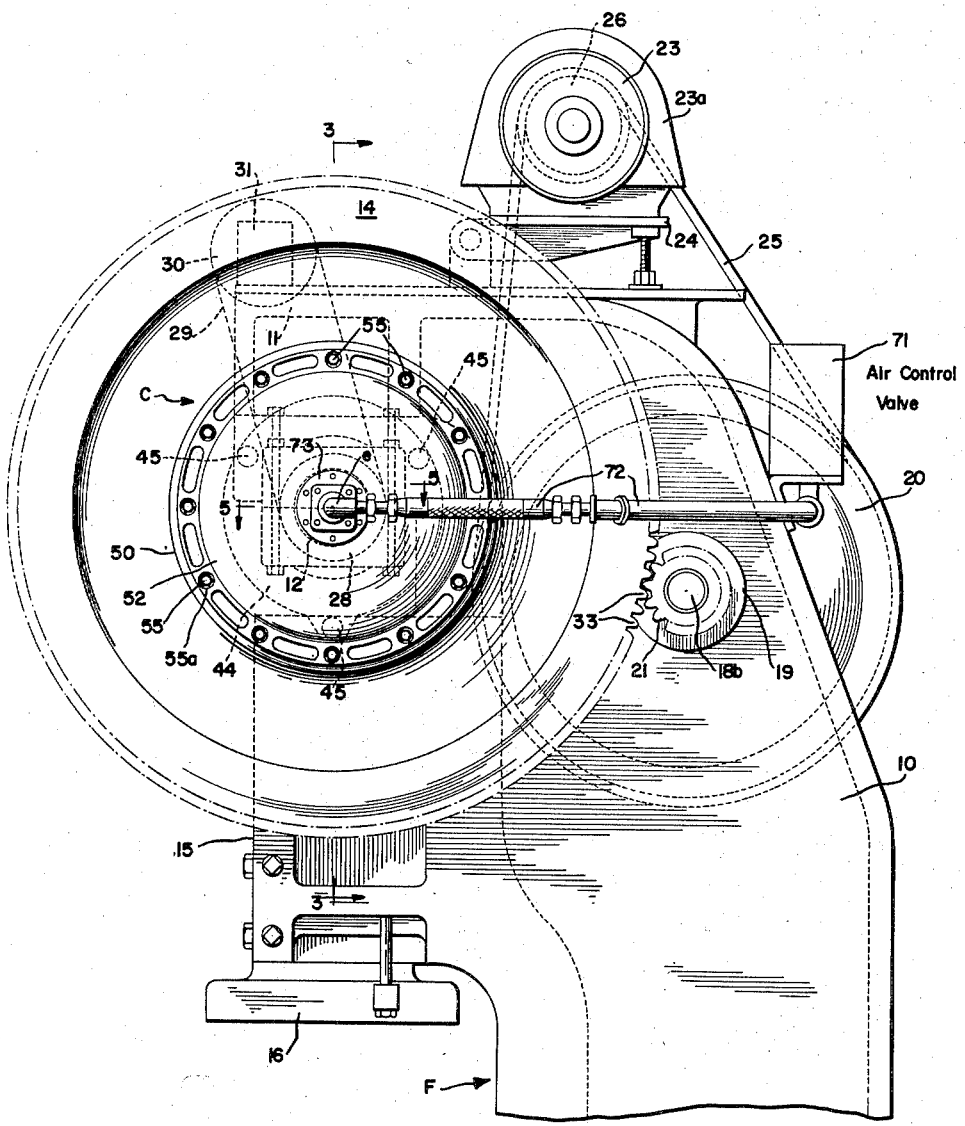
Figure 2 is a side elevation of the press shown in Figure 1 and looking from the right-hand side of Figure 1.

With reference to Figures 1 and 2, the clutch-brake mechanism C—B of this invention is shown in the drawings as applied to a form of press having a cast C-type frame F including spaced vertical supporting side members 10 terminating at their upper ends in a horizontal connecting head or crown 11, forming the forward or front overhanging portion in which a driven crank shaft 12 is journalled in suitable bearings 13 with the crank portion 12$^c$ positioned between said frame members 10 and with one end of the crank-shaft projecting for a distance beyond the frame to support a driving gear 14 and said clutch-brake mechanism. Above the bed or entablature of the press, not shown, the frame members 10 are provided with guides 15 in which a ram or slide 16 is reciprocated vertically by a pitman 17 connecting the ram with the crank 12$^c$. It is to be understood, however, that the press may have two or more cranks 12$^c$ and pitmans 17 to actuate the ram 16.

To the rear of the crank-shaft 12, a driving shaft 18 is journalled in bearings 19 mounted in the frame members 10 with its ends extending beyond the said frame, one end 18$^a$ having a pulley-flywheel 20 keyed thereon and the end 18$^b$ having a pinion gear 21 keyed thereon. The pulley-flywheel 20 is operatively connected with any source of power, such, for instance, as an electric motor-gear reduction unit 23 mounted on a suitable platform 24 supported upon the crown 11 (see Figs. 1 and 2), and connected by a belting 25 passing over a pulley 26, carried on the gear reduction unit 23$^a$, and the pulley-flywheel 20.

The crank-shaft 12 has keyed on one end 12$^a$, extending beyond the adjacent bearing 13, a sprocket 28 connected by a sprocket chain 29 to a sprocket 30 of a timing device indicated, generally, at 31 and mounted on the crown or head 11.

The parts of the press, to which reference has just been made, may be of any desired construction or arrangement suitable for its purpose and with which the present invention is employed, but are usually in the general arrangement shown for mechanical metal-working presses.

The other end 12$^b$ of the crank-shaft 12 extends outwardly beyond its adjacent bearing 13 for a distance sufficient to accommodate thereon the brake B, the gear 14, the clutch C and the fluid-actuated motor M, in the order named, outwardly from the adjacent frame member 10.

For the purpose of the combined clutch-brake mechanism shown, the driving gear 14 is the driving element thereof and is rotatably journalled on the extension 12$^b$ of the crank-shaft by means of thrust roller-bearings 32 (see Figures 3 and 4) and is provided with gear teeth 33 around its periphery meshing with the driving pinion 21, or may be rotated by any other suitable manner than that shown herein, or may be a pulley-flywheel; and the crank shaft 12 is the driven element of the clutch. The gear 14 is positioned on the extended end 12$^b$ of the shaft so as to be spaced from its adjacent bearing 13 and the frame member 10 only sufficiently to accommodate therebetween the brake assembly B of the combination clutch-brake mechanism and the clutch assembly C is positioned outboard of the driving gear 14. The fluid-actuated motor M is carried at the outer end of said clutch assembly C for operating the clutch assembly to engaging position and the brake B is mechanically interconnected through the gear 14 with the clutch assembly so as to be actuated coordinately with the clutch in order that, when the clutch is engaged, the brake is completely released, and conversely.

This arrangement permits the brake B to be securely anchored to the frame 10 of the press instead of to outwardly projecting brackets, gives better stability to the combined clutch-brake assemblies by having its driving element 14 closer to the press frame, allows easier assembly and disassembly of the clutch plates and disc from an unobstructed end of the shaft 12, allows quick removal and replacement of the brake disc, and enables the air motor to act directly upon the clutch to actuate the combined clutch-brake mechanism without the necessity of drilling the shaft 12 to provide air passages to either the clutch or brake.

The clutch C comprises, preferably, a sleeve housing 50 concentric with the shaft 12 and carried by and projecting outwardly from the driving gear 14, it being preferred to cast this housing with said gear, as shown, although this is not necessary. The inner end or inboard portion of the sleeve housing 50 is formed with an interiorly disposed inwardly extending annular wall 51 providing the fixed driving plate of the clutch. The outer end of the sleeve housing 50 is closed by a removable wall member 52, which is somewhat concaved or dished on its inner surface and rimmed by an inwardly extending lateral flange 52$^a$. The inner surface of the rim 52$^a$ forms a relatively short cylindrical wall in which a piston head 53 operates, thus providing the fluid-motor M of the mechanism. In order to conserve space and provide a compact and simple mechanism, the piston 53 is, preferably, a plate-like member somewhat complemental to the inner surface of the end wall member 52 and being provided with a sealing-ring 54 which contacts with said cylindrical wall of the rim 52$^a$. The end wall 52 is removably held firmly in position by stay-rods 55 which extend through openings in the gear 14, in the fixed clutch plate 51 and in the rim of the end wall 52, where said stay-rods are threaded and carry nuts 55$^a$.

The stay-rods 55 are about twelve in number and equally distributed around the housing 50 with their intermediate portions between the fixed clutch-plate 51 and the end wall 52 lying within and near the circumferential wall of said housing to receive, support and guide one or more annular clutch driving plates 56 which are slidable axially of the housing 50 and shaft 12, preferably by the stay-rods extending slidably through openings 56$^a$ in the peripheral marginal portions of the plates 56.

The driven members of the clutch C are the annular discs 57, each having the opposite faces of its outer peripheral area equipped with friction wear surfaces 57$^a$ and positioned between opposing faces of each adjacent pair of clutch plates 51 and 56, as shown in Figure 3. The inner peripheral portions of the annular clutch-discs 57 are splined, as at 58, upon a hub 59 keyed, as at 60, to the outer end 12$^b$ of the shaft 12, a lock-nut 61 being threaded at the extremity of said end to maintain the assembly on said shaft.

The outermost of the annular clutch plates 56 is provided at its inner circumference with an outwardly projecting flange or abutment 56$^b$ to normally contact the inner face of the piston 53, whereby, when compressed air is admitted through the port 62 in the end wall 52, the piston 53 will move to the left in Figures 3 and 4, firmly pressing the slidable clutch-plates 56 and the clutch discs 57 together against the fixed clutch plate 51, thus engaging the clutch assembly. When the air pressure is relieved, it escapes through the port 62 and through a controlled "quick exhaust valve" means 73 (the latter being well known in the art), allowing the clutch to disengage and, when so disengaged, helical compression springs 63 separate the clutch plates and discs to provide a running clearance, thus eliminating undue heating by friction.

The springs 63 are disposed in retaining pockets 64 in the peripheral edges of the clutch plates 51 and 56 and each set of springs is carried by and surrounds an individual push-rod, which push-rods are in end-to-end alignment to actuate a push-plate 65 that engages the thrust-washer 106 of the brake assembly B, when the clutch C is being engaged, and which results in disengagement of the brake. There may be twelve, more or less, of said sets of springs 63, and their associated push rods, equi-spaced around the clutch assembly C. The push-rod 66, between the outermost removable clutch plate 56 (that engages the piston 53) and the next adjacent clutch, has one end slidably mounted in an axially extending opening in said plate and provided with an enlargement or abutment collar 66$^a$ that is held against said plate by its spring 63; and has its other end slidably mounted in a corresponding opening in the next adjacent slidable clutch-plate 56, if there is one provided, to engage and abut the end 67$^a$ of the next push-rod 67 of the set and, in turn, the push-rod 67 will abut the push-rod 68, which has its inner end extending slidably through the gear 14 and fixedly connected to the push-plate 65.

The push-plate 65 is an annular member substantially concentric with the shaft 12 and supported in position by the push-rods 68. The inner circumference of the push-plate is internally threaded and has an externally threaded abutment collar 69 carried therein, which is positioned opposite the friction-face 39 of the thrust-washer 38. The thrust-collar 69 is provided with a lateral outwardly extending flange 70 provided with a number of circumferential bolt holes in its peripheral marginal portion spaced apart to correspond to a .005 of an inch threaded adjustment of the thrust collar 69 in the push-plate 65 with respect to the frictional surface 39 of the thrust-washer 38. Three equally spaced threaded openings are provided in the push-plate and positioned to align with the openings in the flange, through which openings, in the flange and push-plate, bolts 65$^a$ are inserted to hold the parts in their adjusted position. Since the proper functioning of the brake assembly B depends upon maintaining a correct clearance between the thrust collar 69 and the thrust washer 38, when and as wear by friction occurs, it is only necessary to remove the three locking bolts or screws 65$^a$ and then turn the collar until the required running clearance is restored. This adjustment can be readily made when the press is stopped.

As mentioned in the objects of the invention, it has been found that, due to the momentary load imposed as a result of releasing the brakes and applying the clutch against the compression of the springs (of any type that normally biases the brake to braking or applied position), over and above the operational load of the press, the bearings 32 of the pulley-flywheel or gear 14 are stressed too close to their capacity, even though momentarily; but, since the clutching and brake releasing operation is at frequent and close intervals, during the operation of the press, such overloading of the bearings is undesirable as the life of said bearings is directly proportional to the thrust load acting thereupon.

It is proposed, therefore, to reduce this excessive load on the bearings 32 by the interposition of a mechanical leverage which is actuated by the thrust washer 106.

To this end, the braking mechanism, shown in Figures 3, 4, 5 and 6, comprises a hub member 100 keyed, at 101, to the outwardly projected end 12$^b$ of the driven shaft 12 and is positioned immediately adjacent the press frame 10, so that the brake disc 41 may be securely anchored directly to the side of the press frame in the manner above disclosed. The fixed plate 102 of the brake is integral with the hub 100 and is carried by the inboard end of the hub and the axially slidable annular brake plate 103 is positioned around the hub 100 and outwardly of the fixed plate 102, with respect to the shaft 12, to press the brake disc 41 against the fixed plate 102, the brake-plates 102 and 103 being substantially concentric with the shaft 12.

A circular series of spaced apertures 104$a$ (see Figs. 3 and 5) is provided in the brake plate 103 axially thereof and inwardly of the outer peripheral marginal area of the slidable brake plate 103, which engages with the brake disc 41 interposed between the plates 102 and 103, and headed bolts 104 extend through these apertures and are threaded into corresponding openings, respectively, in the fixed brake plate 102. There may be as many as 24 of these bolts, more or less. The heads of the bolts 104 are spaced outwardly for a suitable distance from the plate 103 and compression springs 105 (which may be of the Belleville type as shown) are disposed between the plate 103 and the heads of the bolts to normally bias the slidable plate 103 toward the fixed plate 102, thereby to forcibly grip the brake disc 41 therebetween.

The brake is released by the push-plate 65, the thrust collar 69 of which moves a floating thrust washer 106 to release the brake against the compression of the springs 105. The thrust washer 106 has a wear surface of frictional material 106ᵃ opposing the thrust collar 69. However, the inner circumference of the slidable brake-plate 103 is greater than the outer circumference of the hub 100 to provide an annular space therebetween into which a lateral flange 106ᵃ on said thrust washer 106 slidably extends; and the outer face of the brake plate 103 may be rabbeted, as at 107, to slidably receive and retain the thrust washer 106.

The inner face of the slidable brake plate 103 is provided with a plurality of radial grooves 108 in the area thereof inward from its outer gripping surface, each groove being of a depth and formation to fittedly receive an elongated rectangular bar 109 for a tilting movement therein. The face of each bar 109, opposing the fixed brake plate 102, is oblique to taper from an intermediate point to its inner end, as at 109ᵃ, this point of taper being shown as commencing at approximately its medial point in the drawings. The bars 109 are held in position in said grooves against undue endwise movement by a band 110 closing the outer ends of the grooves 108 and by the opposing surface of the hub 100, it being noted that the inner ends of the bars extend beyond the grooves 108 into the path of movement of the flange 106ᵃ of the thrust washer 106 to be actuated by the inward sliding movement of said thrust washer.

Figure 6:
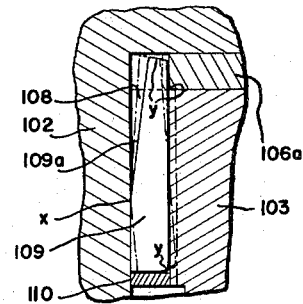
Figure 6 is an enlarged fragmentary view of that portion of Figure 3 illustrating in elevation the disposition of the lever members between the brake plates.
Figure 5:
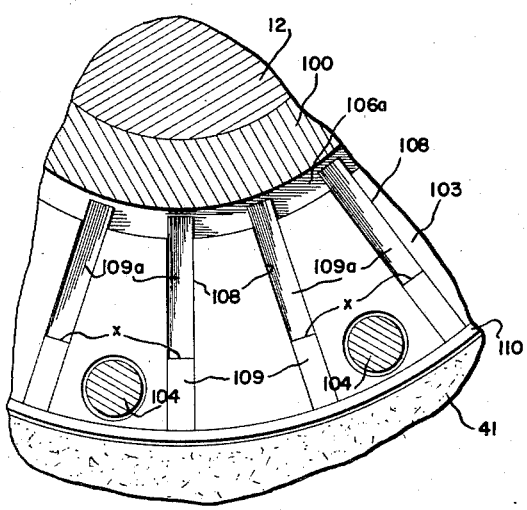
Figure 5 is an enlarged fragmentary sectional view taken substantially on line 7—7 of Figure 3 to further illustrate the construction and assembly of the brake shown in Figure 3.

When the brake B is applied, as shown in Figure 3 by the bias of the springs 105, or their equivalent, the lever-bars 109 assume their full-line position shown in Figures 3 and 6 with their oblique face 109ᵃ spaced from the opposing surface of the fixed brake-plate 102. However, when the brake is to be released and the clutch applied, air acting against the piston 53 first moves the rods 66, 67 and 68 against the tension of their springs 63, resulting in the thrust collar 69 contacting the thrust washer 106 and moving it inwardly (to the left in Figure 3) whereby the flange 106ᵃ shifts the inner ends of the lever-bars 109 causing the bars 109 to fulcrum on their points $x$ bearing on the opposing surface of the fixed brake plate 102; thus the outer ends of said lever-bars press upon the slidable brake plate 103 and move it outwardly (to the right in Figure 3) sufficiently to release the brake; whereupon the piston causes the clutch to engage and this further movement of the thrust collar 69, during the engagement of the clutch, provides a running-clearance for the brake.

While the interposition of the lever-bars 109 requires a slight increase in travel of the clutch and brake (in the order of 1/16–3/32 of an inch over that previously required by the clutch-brake mechanism of the type shown), it reduces the forces transmitted to the flywheel or gear bearing 32 by at least one-half when the fulcrum point $x$ is in the position shown, and this reduction may be varied by the ratio of the leverage employed to suit individual cases. The reduction in spring pressures required for a 2 to 1 lever ratio as used in the assembly shown in Figure 4 is some 8500 to 4250 lbs. Also, by the use of Belleville springs 105 of proper design, this pressure of 4250 lbs. may be still further reduced when the brake is being released.

It will be observed that this construction quite simplifies the construction of the brake and attains the desired results internally of the brake itself, without external additional mechanisms. In order to prevent any binding of the lever-bars 109 in their tilting or fulcruming movement, opposite corners of the lever-bar may slightly rounded as indicated at $y$ in Figures 4a and 6.

The improvements of this invention may be applied to the clutch-brake mechanism of existing presses already in service by substituting the hub 100 carrying the brake plates 102 and 103 with their assembly 104, 105 and 109 and the thrust washer 106 for corresponding parts in existing parts in existing mechanisms of the type shown and described.

From the above, it will be observed that the improvements described and shown herein attain the objects of this invention above set forth.

Having thus described the invention and the manner in which the same is to be performed, it is to be understood that the exact construction herein shown and described may be varied or modified within the spirit and scope of the appended claims; and that the invention is not to be limited to the exact construction shown, but only by the scope of the appended claims.

That which is claimed, as new and to be secured by Letters Patent, is:

1. In a brake mechanism, the combination with coacting braking elements for stopping a rotary member and including a pair of brake plates movable relatively to each other, biasing means moving said plates normally together into braking position; of a plurality of elongated rectangular bars loosely disposed and retained in radial grooves arranged in the inner face of one of said plates and having two opposite faces thereof in normal contact with opposing faces of said plates, one of said faces of said bars being chamfered to form a fulcrum point intermediate its length, one end of each bar projecting beyond said groove, and a movable member for moving said projecting ends of said bars to cause said bars to fulcrum on their fulcrum point against the opposing plate and to cause their opposite ends to move in an opposite direction and shift said plates away from each other, thus releasing said brake mechanism.

2. In a brake mechanism, a circular fixed brake plate; a coacting movable brake plate; biasing means normally urging said movable plate toward said fixed plate to effect the braking operation, a plurality of radial grooves in the inner face of one of said plates; a plurality of bars loosely disposed in said grooves, respectively, and normally contacting opposing surfaces of said plates; an actuating member mounted for movement axially of said plates to move an end of said bars, each of said bars having an end portion of its face opposite the fixed plate chamfered to provide a fulcrum point thereon intermediate its length coacting against the surface of the fixed plate, whereby the opposite ends of said bars are moved in an opposite direction between said plates when actuated by said actuating member, and one of their ends moves the movable plate from said fixed plate, thus releasing said brake mechanism.

3. The subject matter of claim 2 wherein the outer marginal areas of said plates are the effective braking surfaces, and said grooves are in the inner marginal area of the movable plate, and wherein the movable plate is slidably mounted on studs fast to and projecting laterally from the inner marginal area of the fixed plate, and wherein the biasing means are compression springs surrounding said studs between an abutment on the free ends of the studs and said movable plate.

4. In a brake mechanism, a hub, a circumferential brake plate extending from and fixed to said hub, an annular brake plate surrounding said hub with at least a portion of its inner circumference spaced from said hub and mounted for movement to and from said fixed plate to press and to release another brake element between the outer marginal areas thereof, biasing means normally urging said movable plate toward said fixed plate to effect the braking operation, a plurality of radial grooves arranged in a spaced circumferential series in the inner face of the inner marginal area of said movable plate, a plurality of bars one of which being disposed loosely in each of said grooves, respectively, in contact with the opposing surfaces of said plates and having their inner ends projecting from said grooves into the space between said movable plate and said hub, each of said bars having the inner end portion of its face opposing the fixed plate chamfered to form a fulcrum point thereon intermediate its length to act against the fixed plate, and an annular thrust member slidably mounted on and coaxially of said hub and having a part projecting into a space between said movable plate and said hub to contact said projecting ends of said bars and cause them to fulcrum, when said thrust member is moved toward said brake plates, whereby the outer ends of said bars are moved in an opposite direction to shift said movable plate away from said fixed plate, thus releasing the brake mechanism.

5. A combined clutch-brake mechanism for metal-working presses and the like comprising a shaft; a driven member journalled on said shaft and having an antifrictional bearing interposed therebetween; a brake mechanism having coacting brake members including a pair of plates mounted for relative movement on and rotatable with said shaft, biasing means normally urging said brake plates in braking engagement, and a thrust-receiving means including a slidable member on the shaft to disengage said plates, when actuated in one direction, and further including a plurality of levers disposed between and in contact with opposing faces of said brake plates, each lever having a fulcrum point thereon intermediate its ends and mounted to be actuated by said slidable member; a clutch mechanism having the clutch elements thereof surrounding and relatively movable axially of said shaft and biased to normal separated unclutching position, certain of said elements being connected to the driving member to rotate therewith and others of said elements being connected to rotate with said shaft; a thrust means including a collar positioned in opposing and normally spaced cooperating relation with said slidable member for actuating the latter and a linking-connection between the separable clutching elements and said collar for transmitting the motion of said separable clutch elements to said collar; and means for actuating said clutch elements against their bias into clutching engagement and to move said linking-connection to actuate said thrust collar to cause said slidable member to actuate said levers, thereby shifting the brake plates against their bias to non-breaking position and reducing the overload on said bearing between said driving member and the shaft occasioned by the release of the brake and the engagement of the clutch against the force of the biasing means of said clutch and of said brake mechanism.

6. The subject matter of claim 5 wherein said levers each comprises a bar member loosely disposed in a radial groove in one of said brake plates and retained in position by the opposing faces of said brake plates, one end of each bar member being positioned to be engaged by said slidable member during its brake disengaging movement.

7. The subject matter of claim 5 wherein said levers comprise a plurality of bar members loosely disposed in grooves arranged in a spaced radial series in the inner face of one of said plates, each bar member having opposite faces thereof in normal contact with opposing faces of said brake plates and one of said faces of said levers being chamfered to form said fulcrum point intermediate its length and acting upon the opposing brake plate, the said chamfered ends of said bar members being positioned to be contacted by said slidable member to move said bar members on their fulcrums and the opposite ends of said bar members in an opposite direction to separate said brake plates.

References Cited in the file of this patent
UNITED STATES PATENTS

| | | |
|---|---|---|
| 2,021,773 | Gentzel | Nov. 19, 1935 |
| 2,060,692 | Rockwell | Nov. 10, 1936 |
| 2,095,094 | Glasner | Oct. 5, 1937 |
| 2,252,906 | Williamson | Aug. 19, 1941 |
| 2,584,192 | Danly et al. | Feb. 5, 1952 |
| 2,674,356 | Eason | Apr. 6, 1954 |
| 2,747,714 | Eason | May 29, 1956 |
| 2,770,443 | Rand | Nov. 27, 1956 |
| 2,771,966 | Davey | Nov. 27, 1956 |
| 2,778,452 | Dasse | Jan. 22, 1957 |
| 2,778,456 | Ross | Jan. 22, 1957 |